J. H. SPRAGUE.
ANIMAL TRAP.
APPLICATION FILED JULY 18, 1908.
904,024.
Patented Nov. 17, 1908.
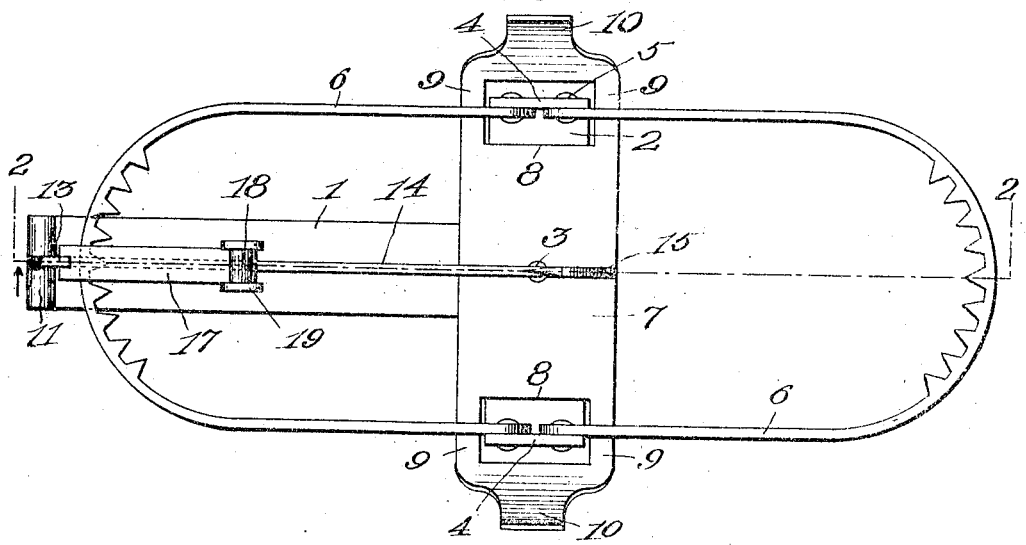
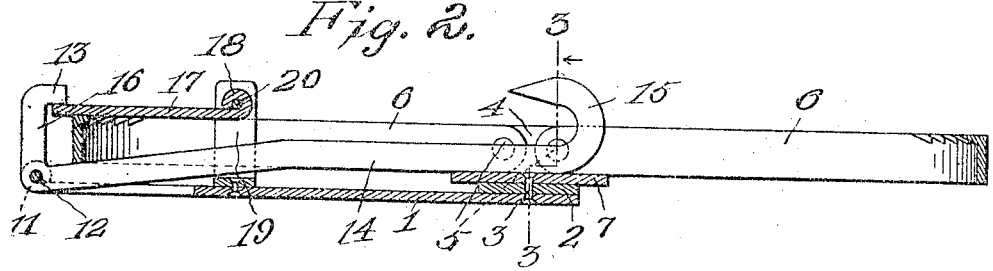
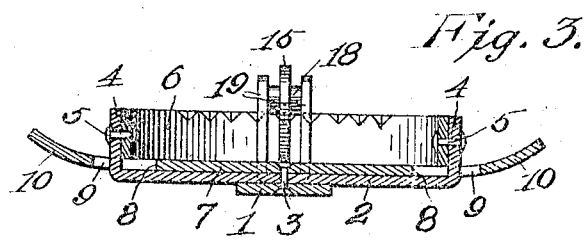
Witnesses
James F. Crown
J. M. Perry
Inventor
James H. Sprague
By Watson E. Coleman
Attorney

UNITED STATES PATENT OFFICE.

JAMES H. SPRAGUE, OF PICEANCE, COLORADO.

ANIMAL-TRAP.

No 904,024.  Specification of Letters Patent.  Patented Nov. 17, 1908.

Application filed July 18, 1908. Serial No. 444,231.

To all whom it may concern:

Be it known that I, JAMES H. SPRAGUE, a citizen of the United States, residing at Piceance, in the county of Rio Blanco and State of Colorado, have invented certain new and useful Improvements in Animal-Traps, of which the following is a specification, reference being had to the accompanying drawings.

My invention relates to improvements in animal traps, and its object is to improve and simplify the construction and operation of devices of this character and thereby render them less expensive, stronger, more durable and effective.

With the above and other objects in view, the invention consists of the novel features of construction and the combination and arrangement of parts hereinafter fully described and claimed and illustrated in the accompanying drawings, in which Figure 1 is a plan view of my improved trap showing it set; Fig. 2 is a vertical longitudinal section taken on the plane indicated by the line 2—2 in Fig. 1; and Fig. 3 is a vertical transverse section taken on the plane indicated by the line 3—3 in Fig. 2.

My improved trap comprises a T-shaped body consisting of a straight longitudinal member 1 and a cross bar or member 2 which latter is secured transversely upon one end of the member 1 by a rivet or similar fastening 3. The ends of the cross bar 2 are bent upwardly as shown at 4 and apertured to receive the pivots 5 of two U-shaped jaws 6. Each of the latter is preferably constructed of a metal strap having its central portion curved and its upper or inner edge notched to provide teeth and its substantial parallel arms united by the rivets or similar pivots 5 to the upturned ends or ears 4 of the cross member 2. The jaws 6 are actuated upwardly and inwardly or toward each other by the spring 7 which is in the form of a broad strap or plate of resilient metal arranged above the cross member 2 and secured to the latter by the rivet or fastening 3. The outer ends of the spring 7 are curved upwardly and are formed with openings 8 to receive the upturned ends 4 of the cross member 2 and the end portions or arms of the U-shaped jaws, the parallel side portions 9 formed by the openings 8 being adapted to engage the outer or lower edges of the jaws so as to actuate the latter to their closed position.

The outer extremities 10 of the spring are shaped so that they may be readily depressed by the feet to straighten the spring and allow the jaws to drop to their proper position when it is desired to set the trap. The outer end of the longitudinal member 1 is notched or bifurcated and the two branches thus formed are bent up so as to form transversely alining bearing eyes 11 for the pivot pin 12 of the trigger 13. This trigger is of right angular shape and has a long arm 14 which extends longitudinally upon the member 1 and has its end bent upwardly and backwardly upon itself to provide a bait hook 15 which latter is disposed above the center of the spring 7. The other arm 16 of the trigger extends upwardly and has at its upper end a lip or projection to engage the front end of a pivoted keeper tongue 17 adapted to extend over the upper edge of one of the jaws of the trap to retain the jaws in their open position. The tongue 17 has its inner end bent so as to provide an eye 18 for a transverse pivot 20 arranged in two upwardly extending bearings 19 on the intermediate portion of the longitudinal member 1. The bearings 19 are preferably formed by the parallel arms of an inverted U-shaped plate which has its closed portion secured to the member 1 by a rivet or the like as shown more clearly in Fig. 2. The bearing arms or projections 19 not only serve as a bearing or support of the pivot or tongue 17, but also as a guide for the trigger 13, the arm of which latter extends between said bearing arms 19 as shown.

In operation, when it is desired to set the trap, the outer ends 10 of the spring 7 are depressed to straighten the spring so that the jaws 6 will drop downwardly into a horizontal plane. The tongue or keeper 17 is then swung over the adjacent jaw 6 and the trigger is engaged with its front end. When an animal nibbles at the bait upon the hook 15 the arm 14 will be lifted and the arm 16 will be sprung upwardly so that its lip or shoulder will release the keeper 17 whereupon the spring will actuate both of the jaws upwardly and inwardly so that they will catch the animal between them.

From the foregoing it will be seen that my improved trap is simple in construction and therefore strong and durable and comparatively inexpensive to manufacture. It is also exceedingly convenient to sell and is highly effective in use.

Having thus described my invention what I claim is:

An animal trap comprising a straight longitudinal body member and cross body member arranged upon one end of the longitudinal member and having its ends upturned, the outer end of the longitudinal member being slit and bent to provide eyes, a pivot in the latter, a right angular trigger upon said pivot and having an inwardly extending longitudinal arm to receive the bait and an upright arm provided with a lip or shoulder, a transverse spring arranged above the cross member and formed adjacent to its ends with openings, a pair of U-shaped jaws pivoted to the upwardly bent ends of the cross member and adapted to extend through the openings in said spring, a U-shaped bearing plate bearing upon the intermediate portion of the longitudinal member of the body and adapted to receive and guide the longitudinal arm of the trigger, and a keeper tongue pivoted in said bearing bracket and adapted to extend over one of the jaws and to engage the lip or projection upon the upright arm of the trigger, substantially as described.

In testimony whereof I hereunto affix my signature in the presence of two witnesses.

JAMES H. SPRAGUE.

Witnesses:
 WILL ROBNETT,
 G. W. PITTMAN.